United States Patent [19]
Lenkens et al.

[11] Patent Number: 6,082,812
[45] Date of Patent: Jul. 4, 2000

[54] OPEN ROOF CONSTRUCTION FOR A VEHICLE

[75] Inventors: Petrus Christiaan Martinus Lenkens, Beugen; Martinus Wilhelmus Maria Nabuurs, Overloon, both of Netherlands

[73] Assignee: Inalfa Industries B.V., Netherlands

[21] Appl. No.: 09/176,144

[22] Filed: Oct. 21, 1998

[30] Foreign Application Priority Data

Nov. 7, 1997 [NL] Netherlands ........................... 1007488
Feb. 10, 1998 [NL] Netherlands ........................... 1008253

[51] Int. Cl.[7] ....................................................... B60J 7/22
[52] U.S. Cl. ........................................... 296/214; 296/217
[58] Field of Search ..................................... 296/217, 214

[56] References Cited

U.S. PATENT DOCUMENTS

| | | | |
|---|---|---|---|
| 4,619,480 | 10/1986 | Motoyama et al. | 296/217 |
| 4,684,168 | 8/1987 | Lupo | 296/217 |
| 5,601,330 | 2/1997 | Ulbrich et al. | 296/217 |
| 5,833,305 | 11/1998 | Watzlawick et al. | 296/217 |

FOREIGN PATENT DOCUMENTS

| | | |
|---|---|---|
| 1.262.135 | 2/1968 | Germany . |
| 3.908.750 | 6/1990 | Germany . |
| 19.549.200 | 7/1997 | Germany . |
| 58-89.419 | 8/1983 | Japan . |
| 60-78.826 | 9/1985 | Japan . |
| 61-169.319 | 12/1986 | Japan . |

*Primary Examiner*—Dennis H. Pedder
*Attorney, Agent, or Firm*—Westman, Champlin & Kelly, P.A.; S. Koehler

[57] ABSTRACT

An open roof construction for a vehicle having a roof opening in its fixed roof comprises a closing element for selectively closing or at least partially opening said roof opening by moving the closing element in rearward direction. A drive unit, electronic control means and a mechanism disposed between said drive unit are intended for moving the closing element. Wind deflection means disposed near an edge of the roof opening deflects the air flow when the vehicle is driving. Driving means are connected to the wind deflection means via a transmission. The control means includes operating means, or it can be connected to measuring means for measuring condition parameters, and it is arranged for adjusting the wind deflection means with the aid of the driving means on the basis of the condition parameters.

14 Claims, 3 Drawing Sheets

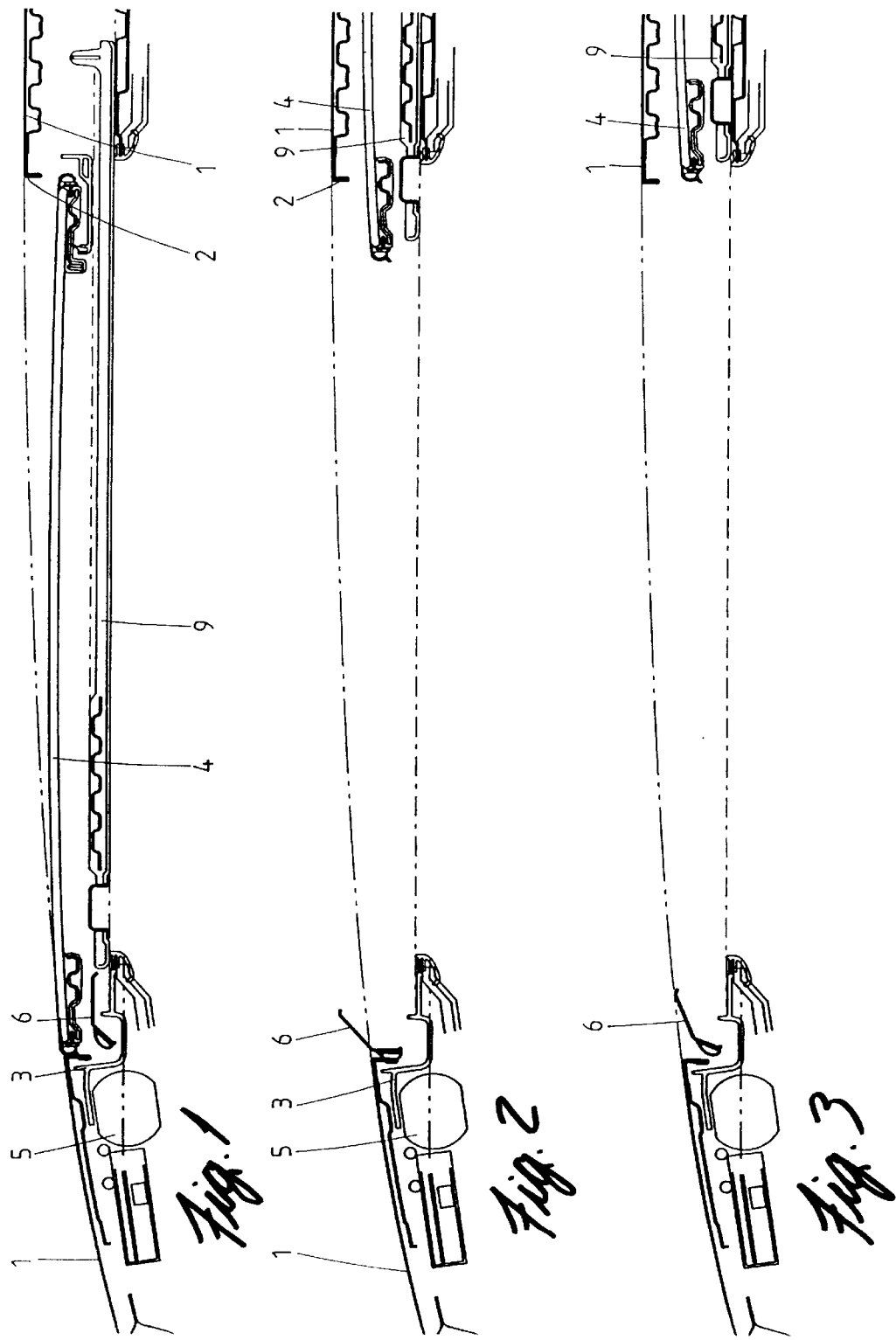

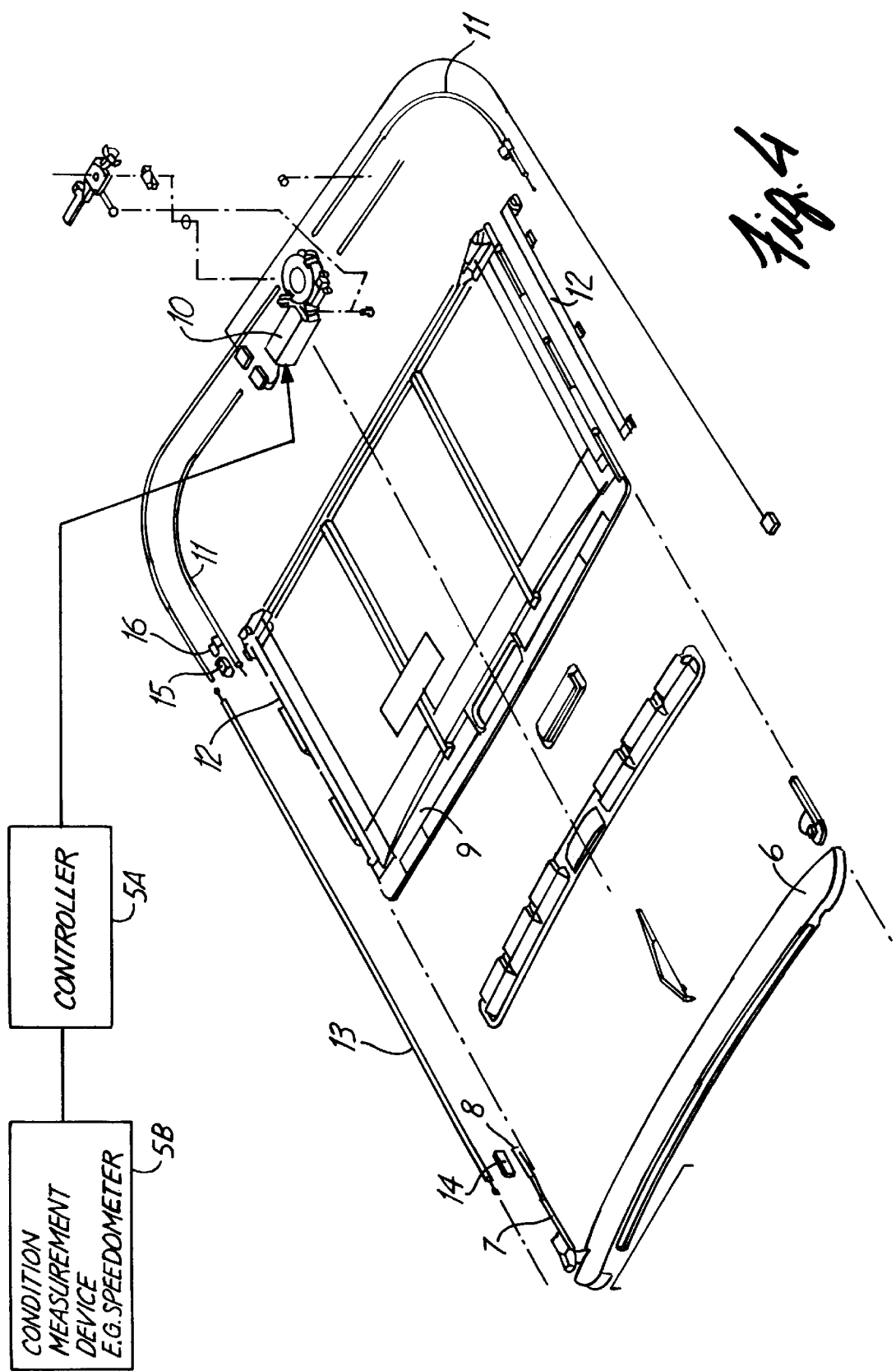

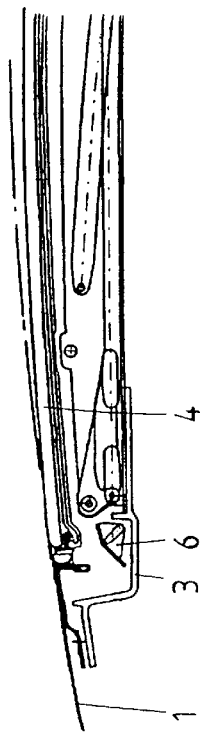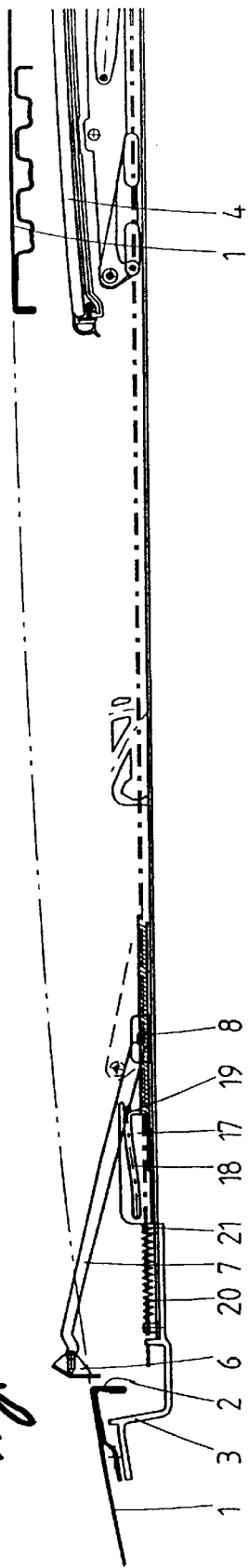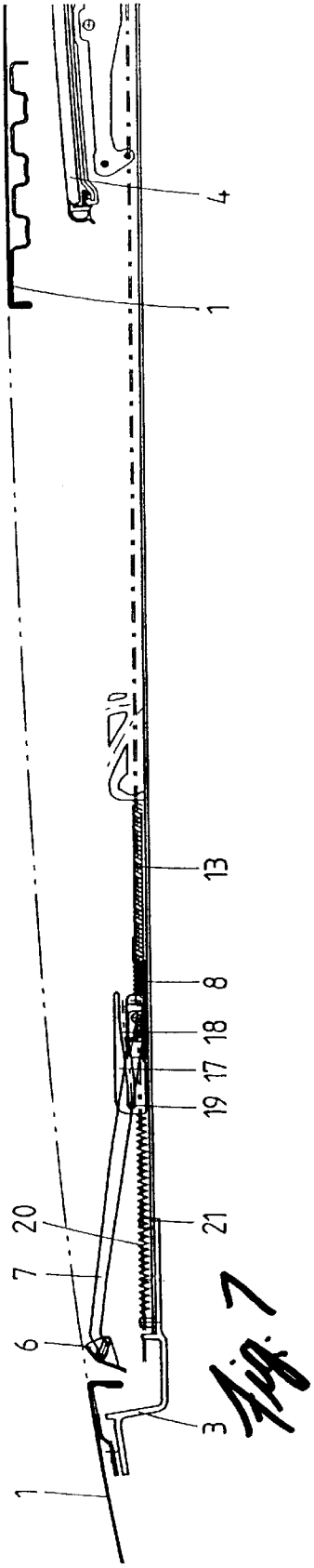

OPEN ROOF CONSTRUCTION FOR A VEHICLE

BACKGROUND OF THE INVENTION

1. Field of the Invention

The present invention relates to an open roof construction for a vehicle having a roof opening in its fixed roof, which open roof construction comprises a closing element for selectively closing or at least partially opening said roof opening by moving the closing element in rearward direction, a drive unit, electronic control means, a mechanism for moving said closing element, which is disposed between said drive unit and said closing element, and wind deflection means disposed near an edge of the roof opening which functions to deflect the air flow when the vehicle is driving.

2. Description of the Related Art

Open roof constructions of this type are known in many versions thereof. In most cases, the wind deflection means consists of a wind deflector which is operated by the closing element, frequently in the form of a rigid panel, upon opening or closing thereof. In the open position of the closing element, the wind deflector occupies a fixed position behind the front edge of the roof opening.

The object of the present invention is to further improve the open roof construction of the kind referred to in the introduction.

SUMMARY OF THE INVENTION

In order to accomplish that objective, the open roof construction according to the invention is characterized by driving means, which are connected to the wind deflection means via a transmission, whilst said control means are connected to said driving means.

The driving means for the wind deflection means makes it possible to adjust said wind deflection means, manually or automatically, for example, to the respective conditions, such as the weather, the speed, the position of the closing element or the like, in order to achieve an optimum operation of the wind deflection means.

Automatic adjustment of the wind deflection means can be achieved if the control means can be connected to measuring means for measuring condition parameters and if they are arranged for adjusting the wind deflection means with the aid of the driving means on the basis of said condition parameters.

The possibility of adjusting the wind deflection means on the basis of individually selected condition parameters enables an optimum adaptation of the position or the setting of the wind deflection means to the respective condition parameter(s). Thus it is possible to select the speed of the vehicle as a condition parameter, whereby it can be determined by testing how to set the wind deflection means in dependence on the speed of the vehicle. Also other control parameters can be selected, of course, such as the position of the closing element, weather parameters and the like. In this manner it is possible to achieve an optimum comfort in the vehicle under varying conditions.

In the case that the wind deflection means comprise a wind deflector, the angle of inclination and/or the longitudinal position of the wind deflector are preferably adjustable.

In the embodiment of the open roof construction which comprises a sun screen which is capable of sliding under the closing element, and which is provided with an associated electric motor for moving the sun screen, it will be advantageous to use the electric motor for the sun screen as the driving means for the wind deflection means, wherein a connecting element connects the sun screen to the wind deflection means for adjustment thereof.

In this manner, the wind deflection means and the sun screen comprise a common drive unit, wherein the connecting element is preferably arranged in such a manner that the wind deflection means are only adjustable near the open position of the sun screen, so that the adjustments of the sun screen which are necessary for adjusting the wind deflection means will be hardly noticeable, if at all. Of course it would also be possible to disconnect the sun screen temporarily when adjusting the wind deflection means.

The driving means for the windscreen may also be combined with the drive unit for the closing element. In that case, a controllable coupling must be provided between the drive unit for the closing element and the transmission means for the wind deflection means, in such a manner that the drive unit for the closing element will or will not drive the wind deflection means depending on the control. This coupling may vary continuously on the basis of several parameters. It would also be possible to adjust the wind deflection means without adjusting the closing element.

The invention will be explained in more detail hereafter with reference to the drawings, which illustrate a number of embodiments of the open roof construction according to the invention.

BRIEF DESCRIPTION OF THE DRAWINGS

FIGS. 1, 2 and 3 are schematic longitudinal sectional views of a first embodiment of the open roof construction according to the invention, in three different positions thereof.

FIG. 4 is a perspective, exploded view of the parts used for driving the wind deflector of FIGS. 1–3.

FIGS. 5–7 are longitudinal sectional views corresponding with FIGS. 1–3 of a part of a second embodiment of the open roof construction according to the invention.

DESCRIPTION OF THE PREFERRED EMBODIMENTS

The drawings, and in the first instance FIGS. 1–3, show the fixed roof 1 of a motor vehicle, such as a passenger car, wherein an opening 2 is formed in fixed roof 1 for the purpose of receiving an open roof construction. The open roof construction comprises a frame 3 or similar stationary means to be mounted on the vehicle for movably supporting a closing element 4, in this case in the shape of a rigid, transparent panel. Closing element 4 may also be made up of a folding cover, or be louvred or the like. Panel 4 can be adjusted between a closed position, in which roof opening 2 is closed, and an open position, in which position the roof opening is at least partially opened. In the illustrated case, panel 4 can be moved slightly downwards from the closed position (see FIG. 1), and rearwards from there to a position under fixed roof 1 (see FIGS. 2 and 3). Additional or alternative movements, such as rearward movement above fixed roof 1, are also possible, of course. A motorized drive unit 5, in this embodiment in the form of an electric motor mounted on the front of frame 3, is provided for moving panel 4. The movements of panel 4 are effected via mechanisms (not shown).

The open roof construction may comprise its own control means 5A (FIG. 4) for controlling the movements, but it is also possible to integrate the control means 5A of the open roof construction with the central onboard computer of the vehicle. In both cases the control means 5A will include measuring means 5A for measuring condition parameters, such as the vehicle speed, which is already measured as standard by the speedometer of the vehicle. This condition parameter is used as an input parameter for the control.

Wind deflection means are provided, in the shape of a wind deflector 6 in the illustrated embodiment, which wind deflection means functions to deflect the wind over roof opening 2 when driving with panel 4 in the open position. Said wind deflector 6 is mounted on frame 3, inwardly of roof opening 2. Said wind deflector 6 is only needed in the rearwardly moved positions of panel 4, and in those cases it can be moved from an inoperative position as shown in FIG. 1 to an operative position as shown in FIGS. 2 and 3. In most cases the movement of wind deflector 6 between the positions shown in FIGS. 1 and 2 takes place by means of panel 4, which operates an arm 7 (see FIG. 4) when panel 4 is being opened or closed.

A comparison of FIGS. 2 and 3 shows that the position of wind deflector 6 has been changed without moving panel 4, which is in the entirely open position. This change of the position of wind deflector 6 has been effected by separate driving means under the control of the aforesaid control means, whereby it is determined on the basis of the measured condition parameter(s) which position of wind deflector 6 is most favorable.

FIG. 4 shows the means for adjusting the wind deflector. The wind deflector shown in this figure is of a well-known type, which hardly needs explaining, if at all. The only thing that matters is the fact that the position of wind deflector 6 (height and angle) is determined by the angle of arm 7, whereby a limiting element (not shown) determines the maximum angular movement in upward direction of arm 7. As is schematically indicated with dimension A, adjustment of the angle of arm 7 takes place by adjusting a lower pivoting point 8 of the arm in longitudinal direction, as a result of which the distance to the limiting element (not shown) is changed and consequently the angle of arm 7 is adjusted.

In the illustrated embodiment, the driving means for adjusting the wind deflector 6 is combined with the driving means for a sun screen 9 provided under panel 4, which is adjusted electrically rather than manually in this case. To this end an electric motor 10 is mounted on the rear side of the frame, which engages, by means of pressure-rigid driving cables 11, separately mounted edges 12 of the sun screen 9, which also function to guide the sliding movement of sun screen 9 in further guide rails (not shown) of the open roof construction on either side of roof opening 2. A pressure-rigid connecting cable 13 is provided on either side of frame 3 for providing a connection with the arm 7 of wind deflector 6, which cable is connected, via a mounting element 14, to pivot point 8 of arm 7 at its front end. Connecting cable 13 comprises a catch element 15 at its rear end, which can be engaged by a mating control element 16 on driving cables 11 for adjusting connecting cable 13, and thus wind deflector 6, in one direction. Adjustment in the other direction is effected by a spring element (not shown). Forced adjustment in two directions is also possible, of course.

As is shown in FIGS. 2 and 3, adjustment of wind deflector 6 is effected by means of a small movement of sun screen 9 near its rearmost position. FIG. 2 shows the position in which the operating elements 16 of driving cables 11 of sun screen 9 just engage catch element 15 of wind deflector 6. In that position, sun screen 6 has disappeared almost entirely into the space present between fixed roof 1 and the roof lining of the vehicle. A small further movement in rearward direction of the sun screen 9, for example over a distance of 1–2 cm, will result in adjustment of wind deflector 6 from one extreme operative position to the other extreme operative position. A smaller movement of sun screen 9 will result in adjustment to intermediate positions of wind deflector 6. The control system of the open roof construction or of the vehicle may be programmed so that when an adjustment of wind deflector 6 is required, sun screen 9 will automatically be moved from a central position to the nearly open position for controlling wind deflector 6. Also other control possibilities are conceivable, of course.

FIGS. 5–7 show a second embodiment of the wind deflector 6, whereby the adjustment of the wind deflector is not effected by moving pivoting point 8 in longitudinal direction, but in this case pivoting point 8 will remain stationary, and the limiting element for limiting the maximum angular movement of arm 7 of wind deflector 6 is adjusted. Said limiting element includes a movable slide 17 comprising a guide slot 18, which mates with a cam 19 on arm 7 of wind deflector 6. Slide 17 is loaded in forward direction by a spring element in the form of a draw spring 20, which attempts to maintain the engagement between slide 17 and a front stop 21. In this front position of slot 18, cam 19 on arm 7 of wind deflector 6 is only limited in upward direction, and cam 19 can freely move downwards so as to allow panel 4 to urge arm 7 downwards in order to move wind deflector 6 to the inoperative position when panel 4 is being closed. The first part of the slot 18 extends parallel to the guide for slide 17, in order to compensate for any play in the drive mechanism without moving wind deflector 6. When slide 17 moves rearwards, cam 19 on arm 7 follows the path of slot 18, and arm 7 is pivoted downwards in dependence thereon, as a result of which wind deflector 6 is adjusted. Slide 17 can be driven in a manner similar to the manner in which mounting element 14 is moved in the embodiment of FIG. 4, that is, via a connecting cable 13, which can be engaged by a driving cable or the like. Spring 20 causes slide 17 to be automatically returned to the front position.

From the foregoing it will be apparent that the invention provides an open roof construction which comprises wind deflection means which can be adjusted manually or automatically, depending on the circumstances, so as to obtain an optimum wind deflection effect, so that an optimum comfort can be maintained in the vehicle under varying circumstances.

The invention is not limited to the above-described embodiments as shown in the drawings, which can be varied in several ways within the scope of the invention. Thus, wind deflection means may be provided near the rear edge or near the side edge of the roof opening as well. Also wind deflection means disposed in front of roof opening 2 are conceivable, such as a flow channel bounded by an adjustable flap.

Furthermore it is possible to provide the wind deflection means with operating means, which can be controlled from driver's position in the vehicle, for example. The driver can determine the position of the wind deflection means himself by means of said operating means, whereby, for example, an optimum noise level is achieved for the driver. The control system may comprise a number of preferred positions, from which the driver can make a selection. Of course it is also possible to provide a continuously variable operation system. Furthermore it may be possible to choose between manual operation and automatic operation of the wind deflector.

What is claimed is:

1. An open roof construction for a vehicle having a roof opening in a fixed roof, the open roof construction comprising:
   a closing element movable to open and close the roof opening;
   a sun screen slidable under the closing element to open and close the roof opening;
   a drive motor coupled to the sun screen to displace the sun screen;
   a wind deflector disposed near an edge of the roof opening and selectively positionable to deflect the air when the vehicle is in motion; and
   a connecting element coupling the sun screen to the wind deflector, wherein displacement of the sun screen adjusts the position of the wind deflector.

2. The open roof construction of claim 1 and further comprising:
   measurement means for measuring a condition parameter of the vehicle; and
   control means coupled to the measuring means and the drive motor, the control means controlling the drive motor as a function of the measured condition parameter.

3. The open roof construction of claim 2 wherein the measuring means comprises a speedometer, and wherein the condition parameter comprises a speed of the vehicle.

4. The open roof construction of claim 1 wherein at least one of an angle of inclination and a longitudinal position of the wind deflector is adjustable.

5. The open roof construction of claim 4 wherein the wind deflector includes a movable limiting element limiting a maximum angle of inclination of the wind deflector, and wherein the connecting element is connected to the limiting element.

6. The open roof construction of claim 5 wherein the limiting element comprises a slide having a slot, and wherein the wind deflector further includes a cam displaceable in the slot to control the inclination of the wind deflector.

7. The open roof construction of claim 4 wherein the wind deflector includes a movable pivoting point, the pivoting point being coupled to the connecting element for movement thereof.

8. The open roof construction of claim 1 wherein displacement of the sun screen proximate the open position causes positional changes of the wind deflector.

9. The open roof construction of claim 8 and further comprising a spring operably coupled to the wind deflector to bias the wind deflector to a selected position, and wherein the connecting element comprises an elongated cable coupled to the wind deflector at a first end and having a catch element at a second end, the catch element disposed in the path of a mating element movable with movement of the sun screen.

10. A method of operating a wind deflector disposed proximate a roof opening in an open roof construction for a vehicle, the vehicle having a closing element and sun screen for opening and closing the opening, the method comprising:
    providing a connecting element connecting the sun screen to the wind deflector; and
    displacing the sun screen between a closed position closing the roof opening and an open position opening the roof opening, wherein displacement of the sun screen causes a positional change of the wind deflector.

11. The method of claim 10 and further comprising measuring a condition parameter of the vehicle, and wherein displacing the sun screen includes displacing the sun screen as a function of the measured condition parameter.

12. The method of claim 11 wherein the condition parameter comprises a speed of the vehicle.

13. The method of claim 11 wherein the positional change comprises at least one of an angle of inclination and a longitudinal position of the wind deflector.

14. The method of claim 10 wherein positional changes of the wind deflector are a function of displacement of the sun screen proximate the open position.

* * * * *